No. 626,760. Patented June 13, 1899.
J. E. KOHN.
APPARATUS FOR TREATING SUGAR JUICES.
(Application filed Dec. 20, 1897.)
(No Model.) 2 Sheets—Sheet 1.
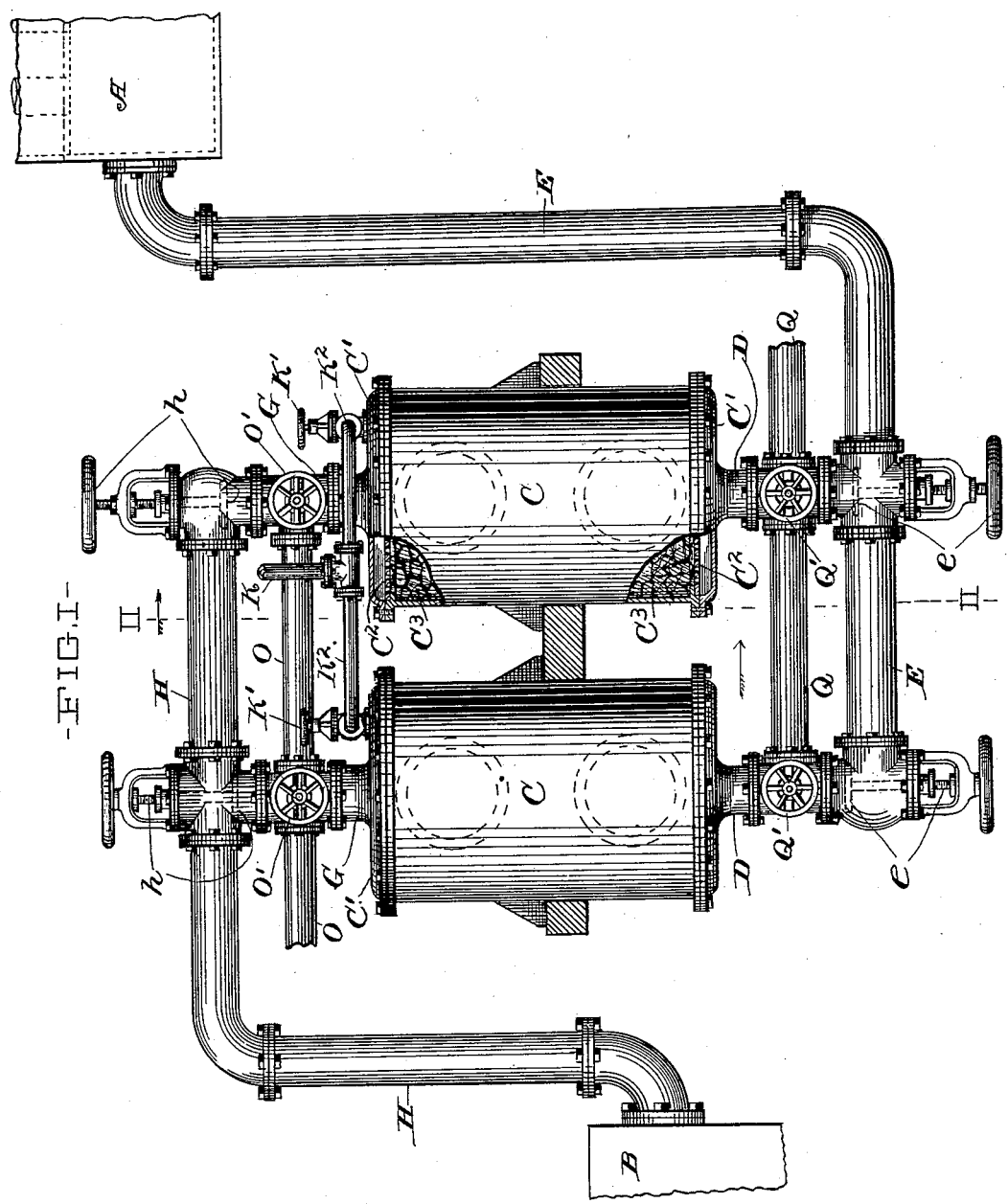
WITNESSES:
INVENTOR
Joseph E. Kohn
BY
ATTORNEYS
THE NORRIS PETERS CO., PHOTO-LITHO., WASHINGTON, D. C.

No. 626,760. Patented June 13, 1899.
J. E. KOHN.
APPARATUS FOR TREATING SUGAR JUICES.
(Application filed Dec. 20, 1897.)
(No Model.) 2 Sheets—Sheet 2.
-FIG.II-
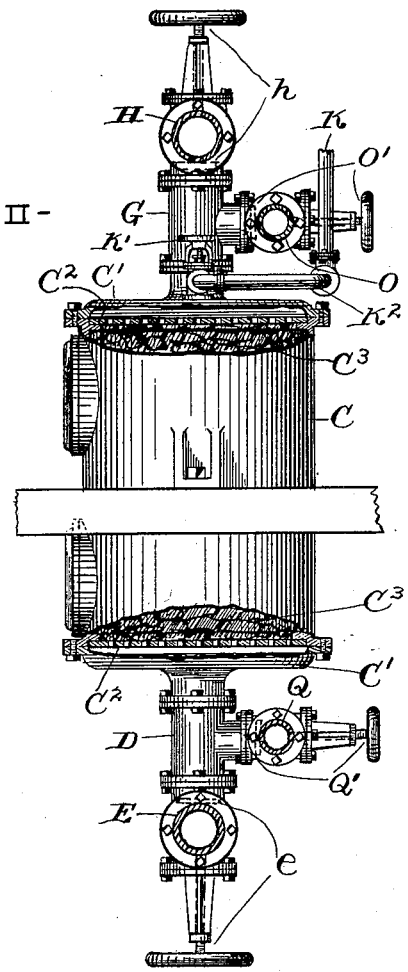
WITNESSES:
Daniel E Daly.
J. L. Ward Hoover.
INVENTOR
Joseph E. Kohn
BY
Lynch, Dover & Donnelly
his ATTORNEYS

UNITED STATES PATENT OFFICE.

JOSEPH E. KOHN, OF CLEVELAND, OHIO, ASSIGNOR OF ONE-HALF TO JOSEPH F. KILBY, OF SAME PLACE.

APPARATUS FOR TREATING SUGAR-JUICES.

SPECIFICATION forming part of Letters Patent No. 626,760, dated June 13, 1899.

Application filed December 20, 1897. Serial No. 662,744. (No model.)

*To all whom it may concern:*

Be it known that I, JOSEPH E. KOHN, of Cleveland, Cuyahoga county, Ohio, have invented certain new and useful Improvements in Apparatus for Treating Sugar-Juices; and I do hereby declare the following to be a full, clear, and exact description of the invention, such as will enable others skilled in the art to which it pertains to make and use the same.

My invention relates to improved apparatus designed for use in the treatment of the sugar-carrying juices obtained from sugar-cane, beet-roots, and other sugar-containing plants, &c.; and the subject of this application consists in the apparatus employed in the treatment of the juice preparatory to the well-known treatment of the juice with milk of lime or other agent or agents employed to correct any acidity and for further clarification of the juice.

It is well known by those skilled in the art that the liquid obtained from a sugar-bearing root or plant contains not only sugar in solution, but also certain albuminous and waxy or pulpy matters and has a great tendency to ferment, and that the liquid has heretofore immediately been treated with a small proportion of milk of lime and heated for a short time. The presence of the said albuminous or nitrogenous matter or impurities in the liquid or juice is detrimental or prejudicial and has materially affected the efficiency and economy in sugar-producing factories. The aforesaid neutralization of the fermenting agencies in and heating of the juice is followed by a treatment of the juice with carbonic-acid gas. The albuminous matter, glucose, and other pulpy or waxy impurities in the juice have in the carbonation an affinity for lime and form organic salts, principally calcium pectate, which, through heating, is formed into pyro and meta pectate that is soluble in the juice. In the juice are also salts of potash and sodium, and these have great affinity for pyro and meta pectate and form in the manipulation new salts of soda and potash pectates which are generally formers of molasses. Alkaline salts in the juice are obstructive to or retard the desired subsequent crystallization of the sugar; but the aforesaid impurties or foreign matter are not only troublesome and harmful in their decomposed state, but are already so in their primary or original form. A small amount of decomposed foreign matter dissolved in the juice after the aforesaid carbonation is sufficient to interfere with the subsequent filtration or refining of the juice, and to the end of removing the said impurities more lime has generally been added; but the fact is that much more lime than theoretically considered necessary is required for the purpose. The expense of the additional lime required is not an inconsiderable item in a sugar-factory, and the use of an additional amount of lime results in a greater loss of sugar in lime cakes and renders the subsequent filtration or refining of the juice more expensive.

The hereinbefore-mentioned annoyances and difficulties heretofore encountered in the production of marketable sugar are effectually avoided by heating the impure natural juice obtained by diffusion or other method of extraction from sugar-bearing roots or plants to a temperature sufficient to coagulate the impurities and then separating the impurities from the juice preparatory to the treatment required for further clarification of the juice. I preferably heat the impure juices to a temperature of about 175° or 180° Fahrenheit; but in any case the juice as obtained from the sugar-bearing roots or plants should be heated to a temperature high enough to effect a coagulation of the albuminous matter and other impurities in the juice, so that the said coagulated impurities can be readily separated from the liquid by a filter before conveyance of the liquid to the place at which it is treated for further clarification or the like.

In the accompanying drawings, Figure I is a side elevation, partly in section, of my improved apparatus; and Fig. II is a vertical section on line II II, Fig. I, and has other portions broken away and in section.

Referring to the drawings, A designates a calorisator or heater to which the juice or liquid obtained by diffusion or other method of extraction from sugar-bearing roots or plants is conveyed in any approved manner and therein heated to a temperature sufficient to coagulate the albuminous and other foreign matter in the juice.

B designates an apparatus wherein the mechanically-purified juice is treated as required for further clarification of the juice.

Heater A and apparatus B are located any suitable distance apart and are connected together by a suitably-constructed passage-way employed in conducting the juices from heater A to apparatus B. Two filters C are shown located in the line of the said passage-way, and the construction of filter illustrated consists of an upright hollow cylinder provided at each end with a head C' and provided internally with two horizontally-arranged perforated diaphragms $C^2 C^2$, located a short distance from the different heads, respectively, and having the space or chamber between them filled or supplied with suitable porous filtering material $C^3$. The lower head of each filter at its central portion has a depending inlet D, that is connected at its lower or receiving end with a pipe E, that leads from and is connected with the discharging end of the heater A, that is arranged at an elevation above the filters, so that the juice or liquid discharged from the heater gravitates to the inlets of the filters. A valve e controls communication between pipe E and the inlet D of the one filter, and another valve e performs a corresponding function between the said pipe and the inlet D of the other filter, and consequently the supply to each filter of the heated juice that requires filtering is controlled by a valve e. The upper head of each filter is provided centrally with an upright outlet G, that at its upper or discharging end is connected with a pipe H, that leads to and is connected with apparatus B, that is arranged at a lower elevation than heater A. A valve h is arranged to control communication between the pipe H and the outlet G of one of the filters, and a correspondingly-arranged valve h, having a corresponding function, controls communication between the main pipe and the outlet G of the other filter, and consequently the passage of the filtered juice from each of the filters to the said pipe H is controlled by a valve h.

A steam-pipe K has two branches $K^2 K^2$. One of these branches is connected with and communicates with the upper end of one of the filters, and the other branch connects and communicates with the upper end of the other filter, and each branch is provided with a valve K' for controlling the supply of steam to the respective filter.

A water-supply pipe O is connected with the outlets G of the filters. A valve O' is arranged to control communication between the said water-pipe and the outlet G of one of the filters, and a correspondingly-arranged valve O' is provided for controlling communication between said pipe and the outlet G of the other filter. A drain-pipe Q is connected with the depending inlets D of the filters. A valve Q' is provided and suitably arranged for the purpose of controlling communication between the said pipe Q and the inlet D of one of the filters, and a correspondingly-arranged valve Q' is provided for controlling communication between the said pipe and the inlet D of the other filter. Pipe Q leads preferably to the apparatus (not shown) employed in extracting (by diffusion or other method) the juice from the sugar-bearing roots or plants.

The object of the construction of apparatus hereinbefore described is to provide for a continuous process. It is obvious that by opening all of the valves that control communication between pipes E and H and the filters and closing the valves that control communication between the water-supply pipe, drain-pipe, and branch steam-pipes and the filters the sugar-juices will pass from heater A to and into the lower ends of both filters, thence upwardly through both filters into pipe H, and thence to apparatus B; but this would not be a continuous process, because the filters when they become filled with impurities or when they have arrested an amount of impurities large enough to obstruct a sufficiently free passage of the juices therethrough have to be cleaned. To avoid an interruption in the process, I operate only one of the filters at a time, and this is done by opening the valves that control communication between the filter desired to be operated and the pipes E and H and closing the valves that control communication between the other filter and the said pipes, and the last-mentioned filter that is thus rendered inoperative has steam admitted thereto by opening the valve of the branch steam-pipe connected with the said filter, and the steam thus supplied to the filter upon opening the valve that interrupts communication between the said filter and pipe Q blows or forces the impurities that have accummulated in the filter and the sugar-juice remaining in the filter back into the juice-extracting apparatus through pipe Q, and thereupon the steam-supply valve is closed and the valve for controlling the supply of water to the filter is opened, and the water passes through the filter from top to bottom and completes the cleaning of the filter, and thereupon the latter is again operated by opening the valves that control communication between the said filter and pipes E and H and closing all remaining valves instrumental in cleaning the said filter, and then the other filter is rendered inoperative and cleaned internally, and so on. The one or the other filter is in operation, and if both filters are not idle at the same time it follows that the flow of sugar-juice from heater A to apparatus B is not interrupted.

What I claim is—

1. An apparatus for the treatment of sugar-carrying juices, comprising a heater A, a clarifying vessel B, and a plurality of filters located between the heater and the vessel, in combination with a pipe connecting the heater with the lower ends of the filters, independent valves controlling the flow from said pipe to the filters, a second pipe connecting the upper ends of the filters with the clarifying vessel, independent valves controlling the flow through this second pipe, a water-pipe communicating with the upper ends of the filters, a steam-pipe also communicating with the upper ends of the filters, valves controlling the flow through said water and steam pipes, and a drain-pipe communicating with the lower ends of the filters, the whole being so arranged that the juice from the heater may be conducted to the clarifying vessel through either filter, substantially as described.

2. The combination of two upright filters arranged side by side; a heating vessel arranged higher than the filters; a receiving vessel arranged lower than the heater; a pipe connecting the said receiving vessel with the upper ends of the filters; valves for controlling communication between the said pipe and the filters; another pipe connecting the lower ends of the filters with the heater's outlet; valves arranged to control communication between the last-mentioned pipe and the filters; a water-supply pipe connected with the upper ends of the filters; valves arranged to control communication between the said water-pipe and the filters; a steam-supply pipe having valved branches connected with the upper ends of the filters; another pipe leading from and connected with the lower ends of the filters, and valves arranged to control communication between the last-mentioned pipe and the filters, all arranged and operating substantially as shown, for the purpose specified.

In testimony whereof I sign this specification, in the presence of two witnesses, this 7th day of October, 1897.

JOSEPH E. KOHN.

Witnesses:
M. MILLARD,
W. B. MCCARTHY.